(12) United States Patent
DeBord et al.

(10) Patent No.: US 12,300,479 B2
(45) Date of Patent: May 13, 2025

(54) VOLTAGE CONTROL FOR ION MOBILITY SEPARATION

(71) Applicant: MOBILion Systems, Inc., Chadds Ford, PA (US)

(72) Inventors: John Daniel DeBord, West Grove, PA (US); Gordon A. Anderson, Benton City, WA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 0 days.

(21) Appl. No.: 18/139,143

(22) Filed: Apr. 25, 2023

(65) Prior Publication Data
US 2023/0268169 A1    Aug. 24, 2023

Related U.S. Application Data

(63) Continuation of application No. 16/880,206, filed on May 21, 2020, now Pat. No. 11,670,495.
(Continued)

(51) Int. Cl.
*H01J 49/06* (2006.01)
*H01J 49/02* (2006.01)
*H01J 49/30* (2006.01)

(52) U.S. Cl.
CPC .......... *H01J 49/063* (2013.01); *H01J 49/022* (2013.01); *H01J 49/065* (2013.01); *H01J 49/30* (2013.01)

(58) Field of Classification Search
CPC ...... H01J 49/063; H01J 49/022; H01J 49/065; H01J 49/30
See application file for complete search history.

(56) References Cited

U.S. PATENT DOCUMENTS

| 5,162,649 A | 11/1992 | Burke |
| 5,789,745 A | 8/1998 | Martin et al. |

(Continued)

FOREIGN PATENT DOCUMENTS

| AU | 2020280042 | 5/2020 |
| CA | 3139058 | 5/2020 |

(Continued)

OTHER PUBLICATIONS

U.S. Appl. No. 62/850,823, filed May 21, 2019.
(Continued)

*Primary Examiner* — David E Smith
(74) *Attorney, Agent, or Firm* — McCarter & English, LLP

(57) ABSTRACT

A device includes a first surface, a second surface and a controller. The second surface is adjacent to the first surface. The first and the second surfaces define a first ion channel therebetween. The first ion channel extends along a first direction. The second surface includes a first plurality of electrodes including a first electrode and a second electrode spaced apart from the first electrode along a second direction lateral to the first direction. The first plurality of electrodes extends along the first direction. The first electrode is configured to receive a first voltage signal and generate at least a portion of a pseudopotential that inhibits ions in the first ion channel from approaching the second surface. The second plurality of electrodes is located between the first electrode and the second electrode and arranged along the first direction. The second plurality of electrodes are configured to receive a second voltage signal to generate a first traveling drive potential that travels along the first direction. The first traveling drive potential is configured to guide ions along the first ion channel. The device further includes a controller electrically coupled to the first and the second (Continued)

surface. The controller is configured to generate the first voltage signal and the second voltage signal.

19 Claims, 12 Drawing Sheets

Related U.S. Application Data

(60) Provisional application No. 62/850,823, filed on May 21, 2019.

(56) References Cited

U.S. PATENT DOCUMENTS

| | | | |
|---|---|---|---|
| 6,417,511 B1 * | 7/2002 | Russ, IV | H01J 49/065 |
| | | | 250/292 |
| 6,791,078 B2 | 9/2004 | Giles et al. | |
| 6,794,641 B2 | 9/2004 | Bateman et al. | |
| 6,800,846 B2 | 10/2004 | Bateman et al. | |
| 6,812,453 B2 | 11/2004 | Bateman et al. | |
| 6,872,939 B2 | 3/2005 | Bateman et al. | |
| 6,884,995 B2 | 4/2005 | Bateman et al. | |
| 6,891,157 B2 | 5/2005 | Bateman et al. | |
| 6,914,241 B2 | 7/2005 | Giles et al. | |
| 7,071,467 B2 | 7/2006 | Bateman | |
| 7,095,013 B2 | 8/2006 | Bateman et al. | |
| 7,205,538 B2 | 4/2007 | Bateman et al. | |
| 7,405,401 B2 | 7/2008 | Hoyes | |
| 7,456,394 B2 * | 11/2008 | Cameron | G01N 30/88 |
| | | | 250/281 |
| 7,491,930 B2 | 2/2009 | Shvartsburg et al. | |
| 7,714,278 B2 | 5/2010 | Boyle et al. | |
| 7,829,841 B2 | 11/2010 | Bateman et al. | |
| 7,838,826 B1 | 11/2010 | Park | |
| 7,960,694 B2 | 6/2011 | Hoyes | |
| 8,288,717 B2 | 10/2012 | Park | |
| 8,319,177 B2 | 11/2012 | Boyle et al. | |
| 8,389,933 B2 | 3/2013 | Hoyes | |
| 8,487,240 B2 | 7/2013 | Koehl | |
| 8,581,177 B2 | 11/2013 | Kovtoun | |
| 8,742,339 B2 | 6/2014 | Hoyes | |
| 8,809,769 B2 | 8/2014 | Park | |
| 8,829,464 B2 | 9/2014 | Hoyes et al. | |
| 8,835,839 B1 | 9/2014 | Anderson et al. | |
| 8,901,490 B1 | 12/2014 | Chen et al. | |
| 8,907,273 B1 | 12/2014 | Chen et al. | |
| 8,921,772 B2 | 12/2014 | Verenchikov | |
| 8,941,054 B2 | 1/2015 | Park et al. | |
| 8,941,055 B2 | 1/2015 | Park et al. | |
| 8,946,626 B2 | 2/2015 | Giles et al. | |
| 8,969,800 B1 | 3/2015 | Tolmachev et al. | |
| 9,063,086 B1 | 6/2015 | Garimella et al. | |
| 9,123,516 B2 | 9/2015 | Hasegawa et al. | |
| 9,123,518 B2 | 9/2015 | Giles et al. | |
| 9,281,170 B2 | 3/2016 | Park et al. | |
| 9,281,172 B2 | 3/2016 | Bateman et al. | |
| 9,417,211 B2 | 8/2016 | Verenchikov | |
| 9,425,035 B2 | 8/2016 | Giles et al. | |
| 9,429,543 B2 | 8/2016 | Jiang et al. | |
| 9,455,132 B2 | 9/2016 | Mordehai et al. | |
| 9,683,964 B2 | 6/2017 | Park et al. | |
| 9,704,701 B2 | 7/2017 | Ibrahim et al. | |
| 9,741,552 B2 | 8/2017 | Park et al. | |
| 9,812,311 B2 | 11/2017 | Anderson et al. | |
| 9,865,442 B2 | 1/2018 | Giles et al. | |
| 9,880,129 B2 | 1/2018 | Bateman | |
| 9,939,408 B2 | 4/2018 | Giles et al. | |
| 9,939,409 B2 | 4/2018 | Ibrahim et al. | |
| 9,966,244 B2 | 5/2018 | Anderson et al. | |
| 10,018,592 B2 | 7/2018 | Ibrahim et al. | |
| 10,060,879 B2 | 8/2018 | Silveira | |
| 10,224,194 B2 | 3/2019 | Ibrahim et al. | |
| 10,224,196 B2 | 3/2019 | Giles et al. | |
| 10,241,079 B2 | 3/2019 | Betz et al. | |
| 10,317,362 B2 | 6/2019 | Harder et al. | |
| 10,317,364 B2 | 6/2019 | Garimella et al. | |
| 10,408,792 B2 | 9/2019 | Betz et al. | |
| 10,424,474 B2 | 9/2019 | Ibrahim et al. | |
| 10,446,381 B2 | 10/2019 | Giles et al. | |
| 10,460,920 B1 | 10/2019 | Smith | |
| 10,466,202 B2 | 11/2019 | Ibrahim et al. | |
| 10,473,620 B2 | 11/2019 | Harder et al. | |
| 10,497,552 B2 | 12/2019 | Ibrahim et al. | |
| 10,522,337 B2 | 12/2019 | Rizzo et al. | |
| 10,665,443 B2 | 5/2020 | Ibrahim et al. | |
| 10,692,710 B2 | 6/2020 | Prabhakaran et al. | |
| 10,720,315 B2 | 7/2020 | Taghioskoui | |
| 10,741,375 B2 | 8/2020 | Hamid et al. | |
| 10,804,089 B2 | 10/2020 | Ibrahim et al. | |
| 10,811,244 B2 | 10/2020 | Green et al. | |
| 10,840,077 B2 | 11/2020 | Taghioskoui | |
| 10,861,687 B2 | 12/2020 | Wildgoose et al. | |
| 10,976,283 B2 | 4/2021 | Ibrahim et al. | |
| 11,209,393 B2 | 12/2021 | Garimella et al. | |
| 11,322,340 B2 | 5/2022 | Hamid et al. | |
| 11,460,439 B2 | 10/2022 | DeBord et al. | |
| 11,543,384 B2 | 1/2023 | DeBord et al. | |
| 11,605,531 B2 | 3/2023 | Brahim et al. | |
| 11,662,333 B2 | 5/2023 | DeBord et al. | |
| 11,670,495 B2 * | 6/2023 | DeBord | H01J 49/022 |
| | | | 250/292 |
| 2006/0169884 A1 | 8/2006 | Syka | |
| 2008/0296495 A1 | 12/2008 | Whitehouse et al. | |
| 2009/0045062 A1 | 2/2009 | Senko et al. | |
| 2012/0256802 A1 | 10/2012 | Masujima et al. | |
| 2016/0071715 A1 | 3/2016 | Anderson et al. | |
| 2016/0209363 A1 | 7/2016 | Clemmer et al. | |
| 2016/0225603 A1 | 8/2016 | Hock et al. | |
| 2017/0076931 A1 * | 3/2017 | Ibrahim | H01J 49/40 |
| 2017/0372881 A1 | 12/2017 | Hoyes | |
| 2019/0004011 A1 * | 1/2019 | Garimella | H01J 49/0027 |
| 2019/0103261 A1 | 4/2019 | Ibrahim et al. | |
| 2019/0108990 A1 | 4/2019 | Prabhakaran et al. | |
| 2019/0122875 A1 | 4/2019 | Berdnikov et al. | |
| 2019/0189393 A1 * | 6/2019 | Ibrahim | H01J 37/21 |
| 2019/0348268 A1 | 11/2019 | Hamid et al. | |
| 2019/0369049 A1 | 12/2019 | Ridgeway | |
| 2019/0369050 A1 | 12/2019 | Garimella et al. | |
| 2020/0161119 A1 | 5/2020 | Richardson et al. | |
| 2020/0200708 A1 | 6/2020 | Ibrahim et al. | |
| 2020/0321190 A1 | 10/2020 | Ibrahim et al. | |
| 2020/0321208 A1 | 10/2020 | Cooks et al. | |
| 2020/0326304 A1 | 10/2020 | Giles et al. | |
| 2020/0378922 A1 | 12/2020 | Ibrahim et al. | |
| 2020/0381241 A1 | 12/2020 | Park et al. | |
| 2021/0080429 A1 | 3/2021 | DeBord et al. | |
| 2021/0364467 A1 | 11/2021 | DeBord et al. | |
| 2021/0382006 A1 | 12/2021 | DeBord et al. | |
| 2022/0074891 A1 | 3/2022 | DeBord et al. | |
| 2022/0136999 A1 | 5/2022 | Garimella et al. | |
| 2022/0365027 A1 | 11/2022 | Makarov | |
| 2023/0103674 A1 | 4/2023 | DeBord et al. | |
| 2023/0187194 A1 | 6/2023 | Deng et al. | |

FOREIGN PATENT DOCUMENTS

| | | | |
|---|---|---|---|
| CN | 202080042186.0 | 5/2020 | |
| EP | 1942340 A1 | 7/2008 | |
| EP | 20809512.5 | 5/2020 | |
| GB | 2457769 A | 9/2009 | |
| GB | 2477832 A * | 8/2011 | G01N 27/622 |
| JP | 2021-569034 | 5/2020 | |
| SG | 11202112635X | 5/2020 | |
| WO | WO-2017062102 A1 * | 4/2017 | G01N 27/622 |
| WO | 2019/125891 A1 | 6/2019 | |
| WO | 2019/222274 A1 | 11/2019 | |
| WO | PCT/US20/33976 | 5/2020 | |
| WO | 2020/201732 A1 | 10/2020 | |

(56) References Cited

FOREIGN PATENT DOCUMENTS

| | | |
|---|---|---|
| WO | 2020/237037 A1 | 11/2020 |
| WO | 2020/243194 A1 | 12/2020 |

OTHER PUBLICATIONS

U.S. Appl. No. 16/880,206, filed May 21, 2020.
Brodeur et al., "Experimental Investigation of the Ion Surfing Transport Method," Int'l Journal of Mass Spec., vol. 336, pp. 53-60, Feb. 2013 (8 pages).
Donohoe, et al., "A New Ion Mobility-Linear Ion Trap Instrument for Complex Mixture Analysis," Anal. Chem., vol. 86, Iss. 16, pp. 8121-8128, Aug. 19, 2014 (17 pages).
G. Bollen, "'Ion Surfing' with Radiofrequency Carpets," Int'l Journal of Mass Spec., vol. 299, pp. 131-138, Jan. 2011 (8 pages).
Hamid et al., "Characterization of Traveling Wave Ion Mobility Separations in Structures for Lossless Ion Manipulations," Anal. Chem., 2015, 87, pp. 11301-11308, published Oct. 28, 2015 (8 pages).
Henderson et al., "ESI/Ion Trap/Ion Mobility/Time-of-Flight Mass Spectrometry for Rapid and Sensitive Analysis of Biomolecular Mixtures," Anal. Chem., vol. 71, Iss. 2, pp. 291-301, Jan. 15, 1999 (Abstract only—1 page).
Hoaglund-Hyzer et al., "Ion Trap/Ion Mobility/Quadrupole/Time-of-Flight Mass Spectrometry for Peptide Mixture Analysis," Anal. Chem., vol. 73, Iss. 2, pp. 177-184, Jan. 15, 2001 (Abstract only—1 page).
Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).
Jiang et al., "Ion Mobility-Mass Spectrometry," Encyclopedia of Anal. Chem., 2013, DOI: 10.1002/9780470027318.a9292 (21 pages).
Li et al., "Ion Mobility Spectrometry with High Ion Utilization Efficiency Using Traveling Wave-Based Structures for Lossless Ion Manipulations (SLIM)," poster presented at the Proceedings of the 68th ASMS Conference on Mass Spectrometry and Allied Topics, Online Meeting, Jun. 1-12, 2020 (1 page).
Li et al., "Ion Mobility Spectrometry with High Ion Utilization Efficiency Using Traveling Wave-Based Structures for Lossless Ion Manipulations," Anal. Chem., vol. 92, Iss. 22, pp. 14930-14938, Oct. 26, 2020 (9 pages).
Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).
Zhang et al., "Ion Trapping, Storage, and Ejection in Structures for Lossless Ion Manipulations," Anal. Chem. 2015, 87, 6010-6016, May 14, 2015 (7 pages).
PCT International Search Report and Written Opinion dated Jul. 30, 2020, issued for PCT Application No. PCT/US2020/033976 (13 pages).
Extended European Search Report dated Apr. 14, 2023, issued for EP Application No. 20809512.5 (10 pages).
Singapore Search Report and Written Opinion dated Jun. 1, 2023, issued for SG Application No. 11202112635X (12 pages).

* cited by examiner

VOLTAGE CONTROL FOR ION MOBILITY SEPARATION

CROSS-REFERENCE TO RELATED APPLICATIONS

The present application claims the benefit of priority to U.S. patent application Ser. No. 16/880,206 filed on May 21, 2020, entitled Voltage Control for Ion Mobility Separation which claims priority to U.S. Provisional Patent Application No. 62/850,823 filed on May 21, 2019 and entitled Voltage Control for Ion Mobility Separation, each of these applications are herein incorporated by reference in their entirety.

FIELD OF THE INVENTION

The present disclosure is directed to systems and corresponding methods for voltage control of ion mobility separation and more particularly to systems and method which can include segmented electrode arrangements and a pulsed or biased voltage signal (e.g. a pulsed current waveform or periodic waveform with no sign reversal) for guiding ions within the system.

BACKGROUND OF THE INVENTION

Ion mobility spectrometry (IMS) is a technique for separating and identifying ions in gaseous phase based on their mobilities. For example, IMS can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

Mass spectrometry (MS) is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection. Ions with different mass-to-charge ratios can undergo different deflections, and can be identified based on the spatial location of detection by a detector (e.g., electron multiplier).

SUMMARY OF THE DISCLOSURE

In general, embodiments of the disclosure provide systems and corresponding methods for voltage control of ion mobility separation.

A device includes a first surface, a second surface and a controller. The second surface is adjacent to the first surface. The first and the second surfaces define a first ion channel therebetween. The first ion channel extends along a first direction. The second surface includes a first plurality of electrodes including a first electrode and a second electrode spaced apart from the first electrode along a second direction lateral to the first direction. The first plurality of electrodes extends along the first direction. The first electrode is configured to receive a first voltage signal and generate at least a portion of a pseudopotential that inhibits ions in the first ion channel from approaching the second surface. The second plurality of electrodes is located between the first electrode and the second electrode and arranged along the first direction. The second plurality of electrodes are configured to receive a second voltage signal to generate a first traveling drive potential that travels along the first direction. The first traveling drive potential is configured to guide ions along the first ion channel. The device further includes a controller electrically coupled to the first and the second surface. The controller is configured to generate the first voltage signal and the second voltage signal.

In one implementation, the second electrode is configured to receive a third voltage signal and generate at least a second portion of the first pseudopotential. In another implementation, the first voltage signal is a first radio frequency (RF) signal and the third voltage signal is a second RF voltage signal, and a phase difference between the first RF voltage signal and the second RF voltage signal has a value in the range of about zero degrees to about 180 degrees. In yet another implementation, the controller includes a first RF control circuit configured to generate the first RF voltage signal, and a second RF control circuit configured to generate the second RF voltage signal.

In one implementation, the controller includes a master control circuit communicatively coupled to the first and the second RF control circuits. The master control circuit is configured to determine one or more of amplitude and/or frequency of the first RF voltage signal, amplitude and/or frequency of the second RF voltage signal, and the phase difference between the first RF voltage signal and the second RF voltage signal. The controller is also configured to provide one or more RF control signals to the first and the second RF control circuits. The one or more RF control signals are indicative of one or more of the amplitude and/or frequency of the first RF voltage signal, the amplitude and/or frequency of the second RF voltage signal, and the phase difference between the first RF voltage signal and the second RF voltage signal.

In one implementation, the second voltage signal is a predetermined voltage/current waveform and the controller includes a plurality of traveling wave control circuits configured to generate a plurality of traveling wave voltage signals. The predetermined voltage/current waveform includes the plurality of traveling wave voltage signals. In another implementation, the predetermined voltage/current waveform is a pulsed voltage waveform including one or more of a sawtooth voltage/current waveform, a rectangular voltage/current waveform and a biased AC waveform or a biased sinusoidal voltage/current waveform. In yet another embodiment, the predetermined voltage/current waveform is periodic waveform with no sign reversal which does not reverse the direction of current flow but still exhibits a time-varying applied potential. In yet another implementation, the plurality of traveling wave control circuits includes one or more of a plurality of alternating current (AC) control circuits and a plurality of direct current control circuit.

In one implementation, the master control circuit is configured to determine one or more of amplitudes and/or frequencies of the plurality of traveling wave voltage signals, and phase differences between one or more traveling wave voltage signals of the plurality of traveling wave voltage signals. The master control circuit is also configured to provide one or more traveling wave control signals to the plurality of traveling wave control circuits. The one or more traveling wave control signals are indicative of one or more of the amplitudes and/or frequencies of the plurality of traveling wave voltage signals, and the phase differences between the one or more traveling wave voltage signals of the plurality of traveling wave voltage signal.

In one implementation, the controller includes a first RF control circuit configured to generate the first voltage signal and a first direct current (DC) control circuit configured to generate a first DC voltage signal. The first voltage signal is the first RF voltage signal and the second electrode is configured to receive the first DC voltage signal. In another implementation, the first plurality of electrodes comprise a third electrode adjacent to the second electrode and extending along the first direction. The third electrode is configured to receive the first voltage signal and generate a second portion of the pseudopotential.

In one implementation, the first and the second surfaces define a second ion channel therebetween. The second ion channel extends along the first direction. The second surface includes a third plurality of electrodes located between the second electrode and the third electrode. The third plurality of electrodes are configured to receive a fourth voltage signal and generate a second traveling drive potential that travels parallel the first direction, the second traveling drive potential is configured to guide ions along the second ion channel. The first ion channel is located between the first and the second electrode and the second ion channel is located between the second and the third electrode. In another implementation, the third plurality of electrodes includes a switch electrode configured to receive a switch voltage signal from a switch control circuit and generate a gate potential, the gate potential configured to guide ions from the second ion channel to the first ion channel.

In one implementation, the controller includes a master control circuit communicatively coupled to the switch control circuit. The master control circuit is configured to determine a time duration during which the switch electrode is configured to generate the gate potential. The master control circuit is also configured to provide a switch control signal to the switch control circuit. The switch control circuit is configured to generate the switch voltage signal during the determined time duration based on the switch control signal. In another implementation, the controller is electrically coupled to a power source and configured to receive a power signal. In yet another implementation, the second electrode of the first plurality of electrodes is electrically coupled to a ground potential.

In one implementation, the controller includes a second DC control circuit configured to generate a bias DC voltage signal. At least one electrode in the first surface is configured to receive the bias DC voltage signal. In another implementation, the first surface is coupled to one or more of (a) a first ion manipulation device characterized by a first ion manipulation device potential, the first surface configured to receive ions from the first ion manipulation device; and (b) a second ion manipulation device characterized by a second ion manipulation device potential, the first surface configured to transfer ions from to the second ion manipulation device. The bias DC voltage signal is less than the first ion manipulation device potential, and/or the bias DC voltage signal is greater than the second ion manipulation device potential. In yet another implementation, the first surface is coupled to an ion source characterized by an ion source potential at a first end of the first surface, and coupled to an ion detector characterized by an ion detector potential at a second end of the first surface. The bias DC voltage signal is greater than the ion detector potential and less than the ion source potential.

A method includes providing a first surface and a second surface adjacent to the first surface. The first and the second surfaces define a first ion channel therebetween. The first ion channel extends along a first direction. The second surface includes a first plurality of electrodes including a first electrode and a second electrode spaced apart from the first electrode along a second direction lateral to the first direction. The first plurality of electrodes extends along the first direction. The second surface also includes a second plurality of electrodes located between the first electrode and the second electrode and arranged along the first direction. The method further includes providing ions along the first ion channel. The method also includes applying, by a controller, a first voltage signal to the first electrode. The first electrode is configured to generate at least a portion of a pseudopotential that inhibits ions in the first ion channel from approaching the second surface. The method also includes applying, by the controller, a second voltage signal to the second electrode. The second electrode is configured to generate a first traveling drive potential that travels along the first direction, and the first traveling drive potential configured to guide ions along the first ion channel.

In one implementation, the method further includes applying by the controller, a third voltage signal to the second electrode. The second electrode is configured to generate at least a second portion of the first pseudopotential. In another implementation, the first voltage signal is a first radio frequency (RF) signal and the third voltage signal is a second RF voltage signal, and a phase difference between the first RF voltage signal and the second RF voltage signal has a value in the range of about zero degrees to about 180 degrees. In yet another implementation, the controller includes a first RF control circuit configured to generate the first RF voltage signal and a second RF control circuit configured to generate the second RF voltage signal.

A device includes a first surface, a second surface and a controller. The second surface is adjacent to the first surface. The first and the second surfaces define a first ion channel therebetween. The first ion channel extends along a first direction. The second surface includes a first plurality of electrodes including a first electrode and a second electrode adjacent to the first electrode along the first direction. The first plurality of electrodes are arranged along the first direction. The first electrode is configured to receive a first RF voltage signal and the second electrode is configured to receive a second RF voltage signal. The second surface includes a second plurality of electrodes spaced apart from the first plurality of electrodes along a second direction lateral to the first direction. The second plurality of electrodes includes a third electrode and a fourth electrode adjacent to the third electrode and arranged along the first direction. The third electrode is configured to receive the second RF voltage signal and the fourth electrode is configured to receive the first RF voltage signal. The first, the second, the third and the fourth electrodes are configured to generate a portion of a pseudopotential that inhibits ions in the first ion channel from approaching the second surface. The device further includes a controller electrically coupled to the first and the second surfaces. The controller is configured to generate the first RF voltage signal having a first phase, and generate the second RF voltage signal having a second phase. The controller sets a first phase difference between the first phase and the second phase to a first predetermined value.

In one implementation, the first plurality of electrodes includes a fifth electrode adjacent to the second electrode along the first direction, and the second plurality of electrodes includes a sixth electrode adjacent to the fourth electrode along the first direction. The controller is configured to generate a third RF voltage signal having a third phase. The controller sets a second phase difference between the second phase and the third phase to another predetermined value (or the first predetermined value). In another implementation, the first plurality of electrodes and the second plurality of electrodes are configured to generate a traveling drive potential that travels along the first direction. The first traveling drive potential is configured to guide ions along the first ion channel.

In one implementation, the controller includes a first RF control circuit configured to generate the first RF voltage signal and a second RF control circuit configured to generate the second RF voltage signal. In one implementation, the controller includes a master control circuit communicatively coupled to the first and the second RF control circuits. The master control circuit is configured to determine one or more of amplitude and/or frequency of the first RF voltage signal, amplitude and/or frequency of the second RF voltage signal, and the first predetermined value. The master control circuit is also configured to provide one or more control signals to the first and the second RF control circuits. The control signal is indicative of one or more of amplitude and/or frequency of the first RF voltage signal, amplitude and/or frequency of the second RF voltage signal, and the first predetermined value.

In one implementation, a speed of the traveling drive potential along the first ion channel is based on a frequency of the first RF voltage signal and/or the second RF voltage signal. In one implementation, a spatial frequency of the traveling drive potential along the first ion channel is based on the first predetermined value. In one implementation, the first electrode is adjacent to the third electrode along the second direction, and the second electrode is adjacent to the fourth electrode along the second direction. In one implementation, the first electrode and the second electrode are spatially shifted from the third electrode and fourth electrode along the first direction.

In one implementation, the device further includes a third plurality of electrodes located between the first plurality of electrodes and the second plurality of electrodes. The third plurality of electrodes are arranged along the first direction. The third plurality of electrodes are configured to receive a third voltage signal and generate a first traveling drive potential that travels along the first direction, and the first traveling drive potential is configured to guide ions along the first ion channel. In one implementation, the third voltage signal is a predetermined voltage/current waveform and the controller includes a plurality of traveling wave control circuits configured to generate a plurality of traveling wave voltage signals. The predetermined voltage/current waveform includes the plurality of traveling wave voltage signals.

In one implementation, the predetermined voltage/current waveform is a pulsed voltage/current waveform including one or more of a sawtooth voltage/current waveform, a rectangular voltage/current waveform and a biased AC waveform or a biased sinusoidal voltage/current waveform. In one implementation, the plurality of traveling wave control circuits includes one or more of a plurality of alternating current (AC) control circuits and a plurality of direct current control circuit. In one implementation, the controller includes a master control circuit communicatively coupled to the plurality of traveling wave control circuits. The master control circuit is configured to determine one or more of amplitudes and/or frequencies of the plurality of traveling wave voltage signals, and phase differences between one or more traveling wave voltage signals of the plurality of traveling wave voltage signals. The master control circuit is also configured to provide one or more traveling wave control signals to the plurality of traveling wave control circuits. The one or more traveling wave control signals are indicative of one or more of the amplitudes and/or frequencies of the plurality of traveling wave voltage signals, and the phase differences between the one or more traveling wave voltage signals of the plurality of traveling wave voltage signal. In one implementation, the controller includes a first direct current (DC) control circuit configured to generate a first DC voltage signal, and the third plurality of electrodes is configured to receive the first DC voltage signal.

In one implementation, the controller includes a second DC control circuit configured to generate a bias DC voltage signal. At least one electrode in each of (or any one of) the first and the second surfaces are configured to receive the bias DC voltage signal. In one implementation, the first surface is coupled to one or more of (a) a first ion manipulation device characterized by a first ion manipulation device potential, the first surface configured to receive ions from the first ion manipulation device; and (b) a second ion manipulation device characterized by a second ion manipulation device potential, the first surface configured to transfer ions to the second ion manipulation device. The bias DC voltage signal is less than the first ion manipulation device potential, and/or the bias DC voltage signal is greater than the second ion manipulation device potential. In one implementation, the first surface is coupled to an ion source characterized by an ion source potential at a first end of the first surface, and coupled to an ion detector characterized by an ion detector potential at a second end of the first surface. The bias DC voltage signal is greater than the ion detector potential and less than the ion source potential.

A device includes a first surface, a second surface and a controller. The second surface is adjacent to the first surface. The first and the second surfaces define a first ion channel therebetween. The first ion channel extends along a first direction. The second surface includes a first plurality of electrodes including a first electrode and a second electrode adjacent to the first electrode along the first direction, the first plurality of electrodes arranged along the first direction. The first electrode is configured to receive a first RF voltage signal and the second electrode is configured to receive a DC voltage signal. The second surface includes a second plurality of electrodes spaced apart from the first plurality of electrodes along a second direction lateral to the first direction. The second plurality of electrodes includes a third electrode and a fourth electrode adjacent to the third electrode and arranged along the first direction. The third electrode is configured to receive the second RF voltage signal and the fourth electrode is configured to receive the DC voltage signal. The first, the second, the third and the fourth electrodes are configured to generate a portion of a pseudopotential that inhibits ions in the first ion channel from approaching the second surface. The device further includes a controller electrically coupled to the first and the second surfaces. The controller is configured to generate the first RF voltage signal having a first phase and the DC voltage signal.

A device includes a first surface, a second surface and a controller. The second surface is adjacent to the first surface. The first and the second surfaces define a first ion channel therebetween. The first ion channel extends along a first direction. The second surface includes a first plurality of electrodes including a first electrode and a second electrode adjacent to the first electrode along the first direction, the first plurality of electrodes arranged along the first direction. The first electrode is configured to receive a first RF voltage signal and the second electrode is configured to receive a second RF voltage signal. The second surface includes a second plurality of electrodes spaced apart from the first plurality of electrodes along a second direction lateral to the first direction. The second plurality of electrodes includes a third electrode and a fourth electrode adjacent to the third electrode and arranged along the first direction. The third electrode is configured to receive the first RF voltage signal and the fourth electrode is configured to receive the second RF voltage signal. The first, the second, the third and the fourth electrodes are configured to generate a portion of a pseudopotential that inhibits ions in the first ion channel from approaching the second surface. The first electrode is aligned with the third electrode along the second direction and the second electrode is aligned with the fourth electrode along the second direction. The device further includes a controller electrically coupled to the first and the second surfaces. The controller is configured to generate the first RF voltage signal having a first phase, and generate the second voltage signal having a second phase. A first phase difference between the first phase and the second phase is set to a first predetermined value (e.g., by the controller).

A method includes providing a first surface and a second surface adjacent to the first surface. The first and the second surfaces define a first ion channel therebetween. The first ion channel extends along a first direction. The second surface includes a first plurality of electrodes including a first electrode and a second electrode adjacent to the first electrode along the first direction. The first plurality of electrodes is arranged along the first direction. The second surface also includes a second plurality of electrodes is spaced apart from the first plurality of electrodes along a second direction lateral to the first direction. The second plurality of electrodes includes a third electrode and a fourth electrode adjacent to the third electrode and arranged along the first direction. The method further includes providing ions along the first ion channel. The method also includes applying, by a controller, a first RF voltage signal to the first electrode and the fourth electrode, and a second RF voltage signal to the second electrode and the third electrode. The first, the second, the third and the fourth electrodes are configured to generate a portion of a pseudopotential that inhibits ions in the first ion channel from approaching the second surface.

In one implementation, the first plurality of electrodes and the second plurality of electrodes are configured to generate a traveling drive potential that travels along the first direction. The first traveling drive potential is configured to guide ions along the first ion channel. In one implementation, the second surface further includes a third plurality of electrodes located between the first plurality of electrodes and the second plurality of electrodes are arranged along the first direction. In one implementation, the method further includes applying, by a plurality of traveling wave control circuits, a third voltage signal to the third plurality of electrodes. The third plurality of electrodes are configured to generate a first traveling drive potential that travels along the first direction. The first traveling drive potential configured to guide ions along the first ion channel. In one implementation, the third voltage signal is a predetermined voltage/current waveform, and the plurality of traveling wave control circuits is configured to generate a plurality of traveling wave voltage signals. The predetermined voltage/current waveform includes the plurality of traveling wave voltage signals.

BRIEF DESCRIPTION OF THE FIGURES

These and other features will be more readily understood from the following detailed description taken in conjunction with the accompanying drawings, in which.

DETAILED DESCRIPTION OF THE PREFERRED EMBODIMENTS

Certain exemplary embodiments will now be described to provide an overall understanding of the principles of the structure, function, manufacture, and use of the systems, devices, and methods disclosed herein.

Ion mobility spectrometry (IMS) is a commonly used technique for detecting and analyzing ions based on their mobility. For example, IMS can be used to detect biomarkers (e.g., proteins) which can allow for detection of disease signatures. It can be desirable that ion detection using IMS is accurate (e.g., fewer false positives), sensitive (e.g., capable of detecting low concentration of biomarker), has high throughput (e.g., faster detection), and has high resolution (e.g., differentially detect ions with similar mobility). Structures for Lossless Ion Manipulation (SLIM) technology can provide devices and methods for improved IMS detection. For example, SLIM technology can provide for remarkable control of spatial and/or temporal distribution of electric potential which in turn can allow for improved control of the ion separation process. This application describes systems and methods of voltage control of SLIM devices that can result in improvement in throughput and efficiency (e.g., smaller power consumption) of SLIM devices.

Figure 1:
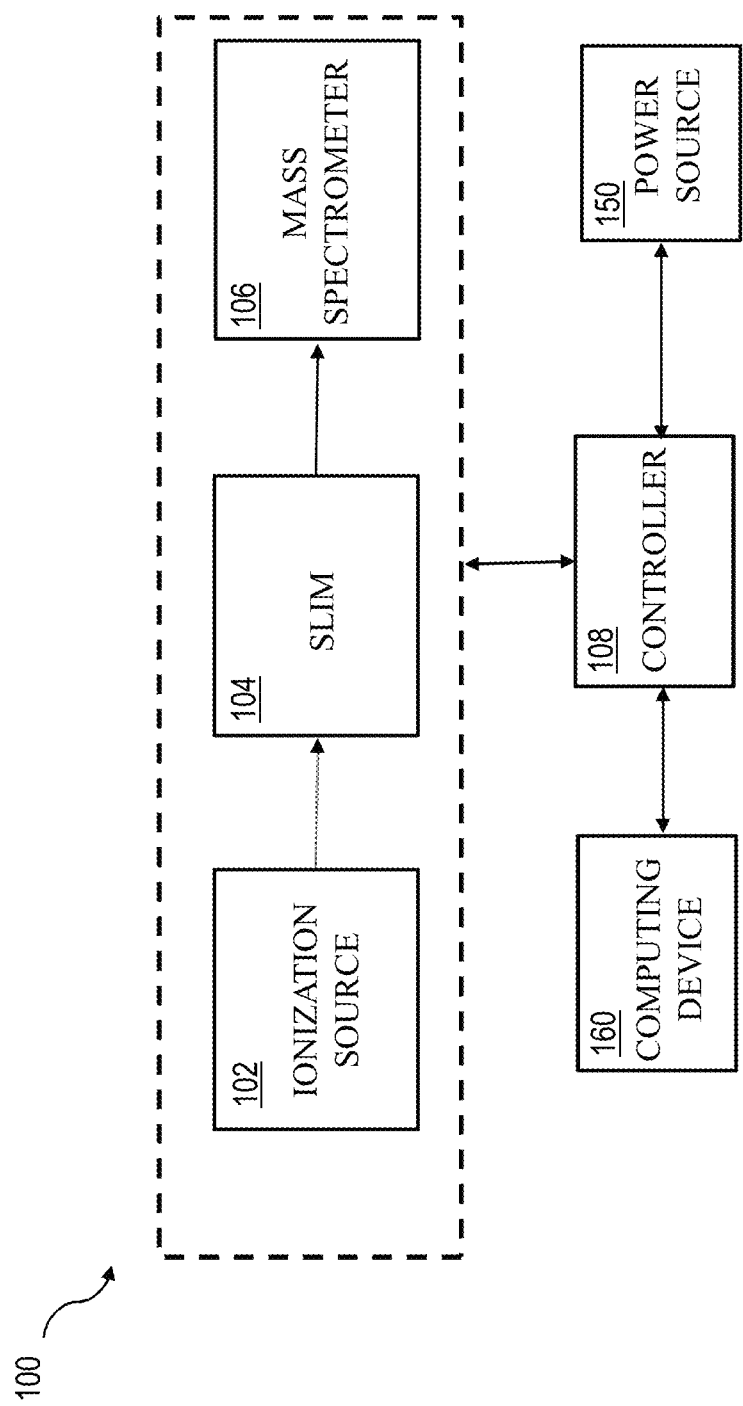
FIG. 1 is a schematic illustration of an exemplary ion mobility separation (IMS) system.

FIG. 1 is a schematic illustration of an exemplary ion mobility separation (IMS) system 100. The IMS system 100 includes an ion source 102 that can generate ions (e.g., ions having varying mobility and mass-to-charge-ratio) and inject the ions into a SLIM device 104. This can be done at multiple time instances (e.g., periodically). The SLIM device 104 can include one or more surfaces (e.g., made of printed board material) that can include electrodes arranged on the surfaces. The electrodes can receive voltage signals/ voltage waveform/current waveform (e.g., DC voltage/current, RF voltage/current, AC voltage/current or a superposition thereof), and can generate a potential (e.g., potential gradient) to confine ions in the SLIM device and guide ions through the SLIM device 104 (which can result in separation of ions based on their mobility). A mass spectrometer 106 can receive ions from the SLIM device 104 and can perform mass spectroscopy on the received ions.

A controller 108 can control the operation of one or more of the ion source 102, the SLIM device 104 and the mass spectrometer 106. The controller 108 can receive power from a power source 150 (e.g., DC power source that provides a DC voltage to the controller 108). The controller 108 can include multiple power supply modules (e.g., current/voltage supply circuits) that generate various voltage (or current) signals that drive the electrodes in the SLIM device 104. For example, the controller 108 can include RF control circuits that generate RF voltage signals, traveling wave control circuits that generate traveling wave voltage signals, DC control circuits that generate DC voltage signals, etc. The controller 108 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the SLIM device 104.

In some implementations, the SLIM device 104 can generate a traveling voltage/current waveform (resulting from potentials generated by multiple electrodes in the SLIM device 104) that can perform mobility-based separations. The voltage/current waveform can travel through the SLIM device 104 at a predetermined velocity based on, for example, frequency of voltage signals applied to the electrodes of the SLIM device, 104. In some implementations, the traveling voltage/current waveform can be spatially periodic and the spatial periodicity can depend on the phase differences between the voltage signals applied to adjacent electrode pairs (e.g., along the direction of propagation of ions in the SLIM device 104). In some implementations, the phase differences can determine the direction of propagation of the voltage/current waveform. The master control circuit can control the frequency and/or phase of voltage outputs of RF/traveling wave control circuits such that the traveling voltage/current waveform has a desirable (e.g., predetermined) spatial periodicity and/or speed.

In some implementations, the controller 108 can be communicatively coupled to a computing device 160. For example, the computing device 160 can provide operating parameters of the SLIM device 104 via a control signal to the master control circuit. In some implementations, a user can provide the computing device 160 (e.g., via a user interface) with the operating parameters. Based on the operating parameters received via the control signal, the master control circuit can control the operation of the RF/AC/DC control circuits which in turn can determine the operation of the SLIM device 104. In some implementations, RF/AC/DC control circuits can be physically distributed over the IMS system 100. For example, one or more of the RF/AC/DC control circuits can be located on the SLIM device 104.

Figure 2:
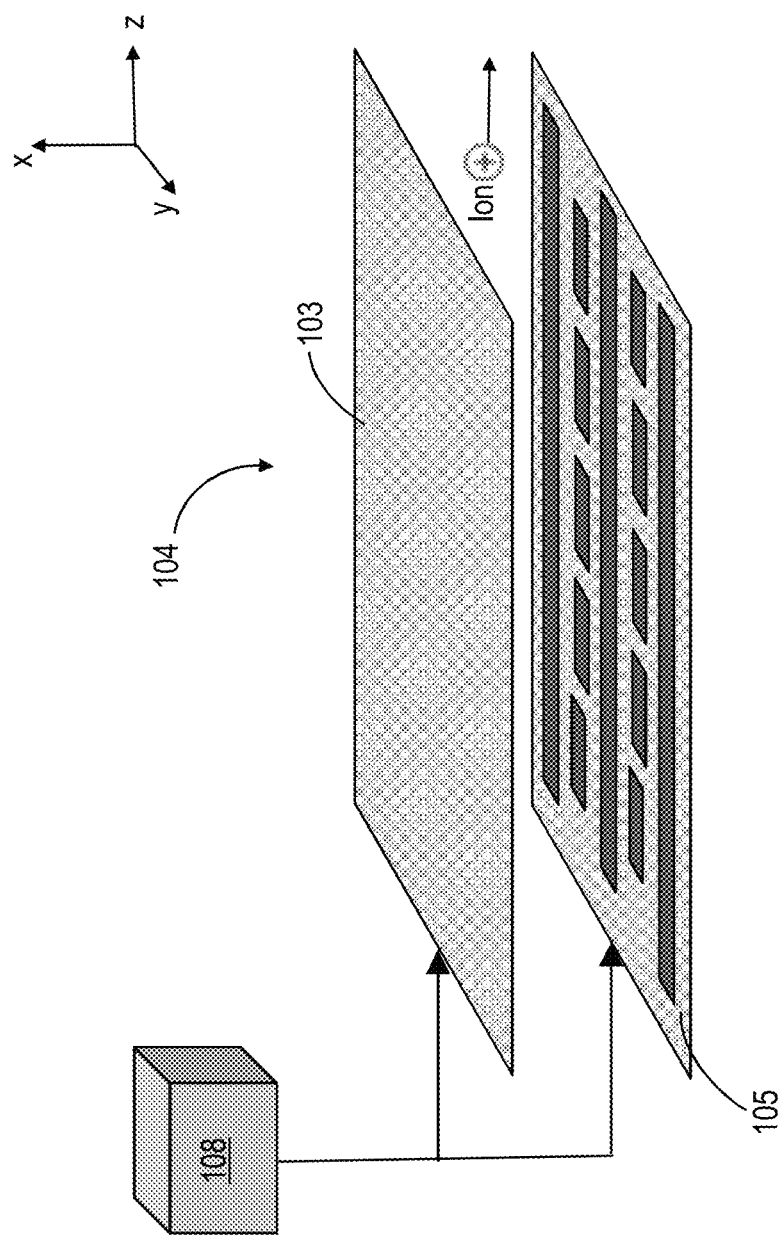
FIG. 2 illustrates an exemplary embodiment of a SLIM device of the IMS system in FIG. 1.

FIG. 2 illustrates an exemplary embodiment of the SLIM device 104. The SLIM device 104 can include a first surface 103 and a second surface 105. The first and second surfaces can be arranged (e.g., parallel to one another) to define one or more ion channels between them. The first surface 103 and second surface 105 can include electrodes (e.g., arranged as arrays of electrodes on the surfaces facing the ion channel). The electrodes on the first surface 103 and second surface 105 can be configured to electrically couple to the controller 108 and receive voltage signals/voltage waveforms. In some implementations, the first surface 103 and second surface 105 can include a backplane that includes multiple conductive channels that allow for electrical connection between the controller 108 and the electrodes on the first surface 103 and second surface 105. In some implementations, the number of conductive channels can be fewer than the number of electrodes. In other words, multiple electrodes can be connected to a single electrical channel. As a result, a given voltage (or current) signal can be transmitted to multiple electrodes simultaneously. Based on the received voltage signals, the electrodes can generate one or more potentials (e.g., a superposition of various potentials) that can confine, drive, manipulate and/or separate ions along a propagation axis (e.g., z-axis).

The controller 108 can include one or more RF, DC and traveling wave control circuits. In some implementations, a first RF control circuit can provide RF voltage signal to one or more electrodes coupled to the first surface 103 and a second RF control circuit can provide RF voltage signal to one or more electrodes coupled to the second surface 105. Having multiple RF control circuit (e.g., separate control circuits for different surfaces) can be desirable as the RF power needed to operate the SLIM device 104 can be distributed over multiple RF control circuits (which in turn can receive power from multiple power sources).

Figure 3:
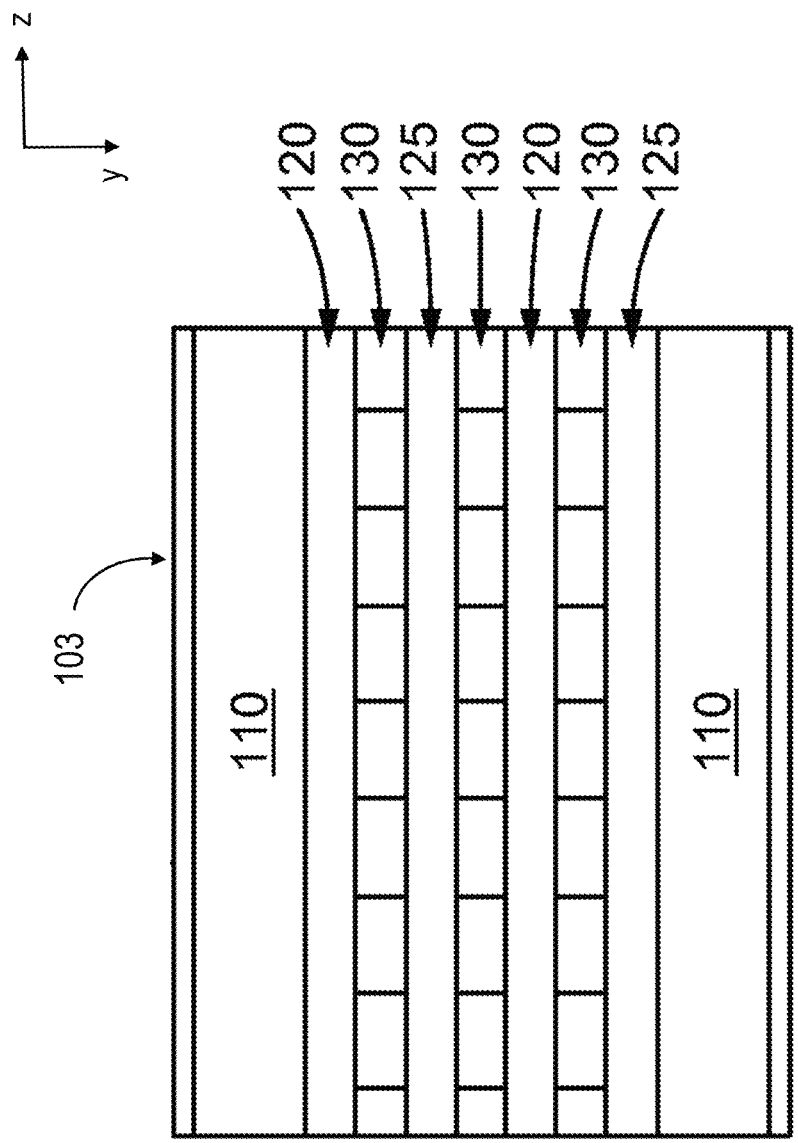
FIG. 3 illustrates an exemplary arrangement of electrodes on a surface of the SLIM device in FIG. 2.

As noted above, the first and the second surfaces 103 and 105 can include a plurality of electrodes. FIG. 3 illustrates an exemplary arrangement of electrodes on the first surface 103. Although the electrode arrangement on the first surface 103 is described below, second surface 105 can include electrodes with a similar electrode arrangement. The first surface 103 includes a first plurality of electrodes 120 and 125 that can receive voltage signals (or are connected to ground potential) and can generate a pseudopotential that can prevent/inhibit ions from approaching the first surface 103. The first plurality of electrodes 120 and 125 can be rectangular and the longer edge of the rectangle can be arranged along the direction of propagation of ions undergoing mobility separation ("propagation axis"). For example, in FIG. 3, the propagation axis is parallel to the z-axis. The first plurality of electrodes can be separated from each other along a lateral direction (e.g., along the y-axis). For example, the lateral direction can be perpendicular to the propagation axis (e.g. the z axis).

The first surface 103 can include a second plurality of electrodes 130 that can be located between the electrodes of the first plurality of electrodes (e.g., in the space between the first plurality of electrodes 120 and 125). The second plurality of electrodes 130 can include multiple electrodes that are segmented/arranged along (or parallel to) the propagation axis. The second plurality of electrodes 130 can receive a second voltage signal and generate a drive potential that can drive ions along the propagation axis. The drive potential can lead to separation of ions based on their mobility as they move along the propagation axis.

The first surface can include guard electrodes 110 that are positioned adjacent to the outer most of the first/second plurality of electrodes. For example, the guard electrodes 110 can be located at the edges of the first surface 103 along the lateral direction The guard electrodes 110 can receive a voltage signal (e.g., DC voltage signal from a DC control circuit) and generate a guard potential that can confine ions in the ion channels between the guard electrodes along the lateral direction. Depending upon the voltage signal applied to the guard electrodes 110, the guard electrodes can also manipulate movement of the ions between the first and second surfaces.

Figure 4A:
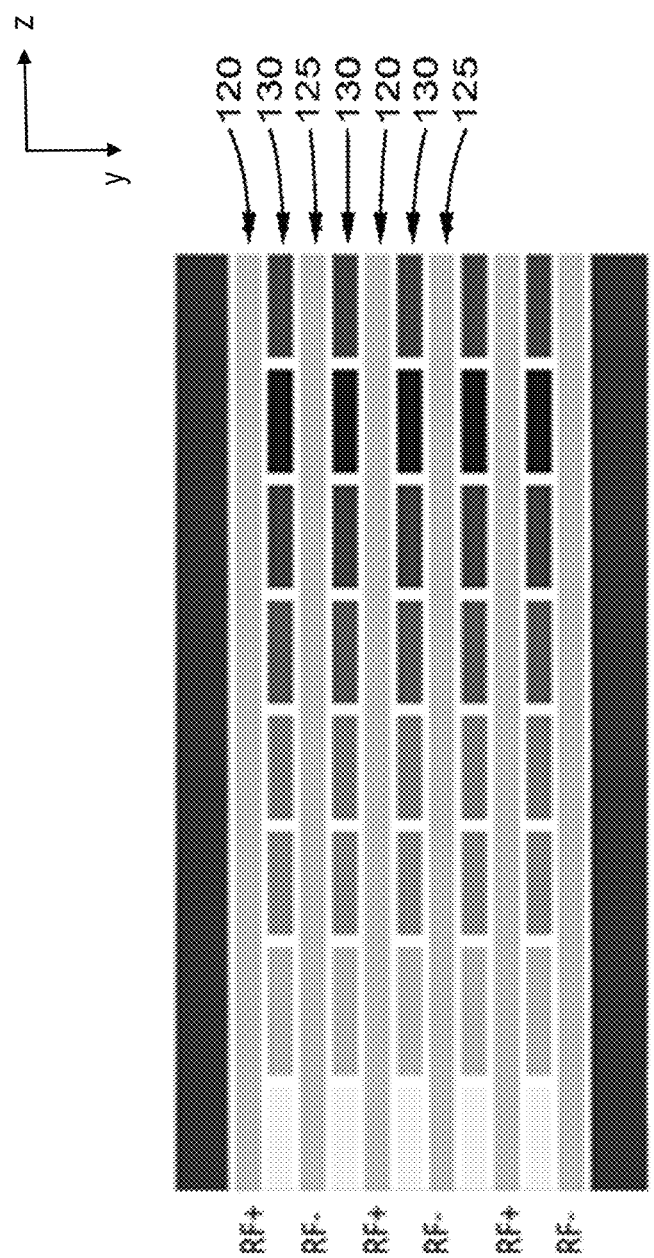
FIG. 4A illustrates a first exemplary operation of electrodes of a surface of a SLIM device.

The first plurality of electrodes, the second plurality of electrodes, and the guard electrodes can be connected to one or more voltage control circuits (e.g., voltage control circuits in the controller 108). In some implementations, first plurality of electrodes 120 and 125 can receive radio frequency (RF) signals that are phase shifted with respect to each other. In some implementations, the master control circuit can control the operation of two RF control circuits to generate two RF voltage signals that are phase shifted from one another. FIG. 4A illustrates an exemplary operation of a SLIM device where the adjacent electrodes of the first plurality of electrodes receive RF voltage signals that are phase shifted by 180 degrees. The electrode 120 can be electrically coupled to a first RF control circuit and the electrode 125 can be coupled to a second RF control circuit. The first and the second RF control circuits can generate RF voltage signals that are phase shifted from each other. For example, the phase shift between the RF voltage signals generated by the first and second RF control circuits can range between zero degrees and 180 degrees (e.g., 0 degrees, 15 degrees, 30 degrees, 45 degrees, 60 degrees, 75 degrees, 90 degrees, 105 degrees, 120 degrees, 135 degrees, 150 degrees, 165 degrees, 180 degrees, etc.). The phase shift can be determined by the master control circuit that can control the operation of the RF control circuits.

Figure 4B:
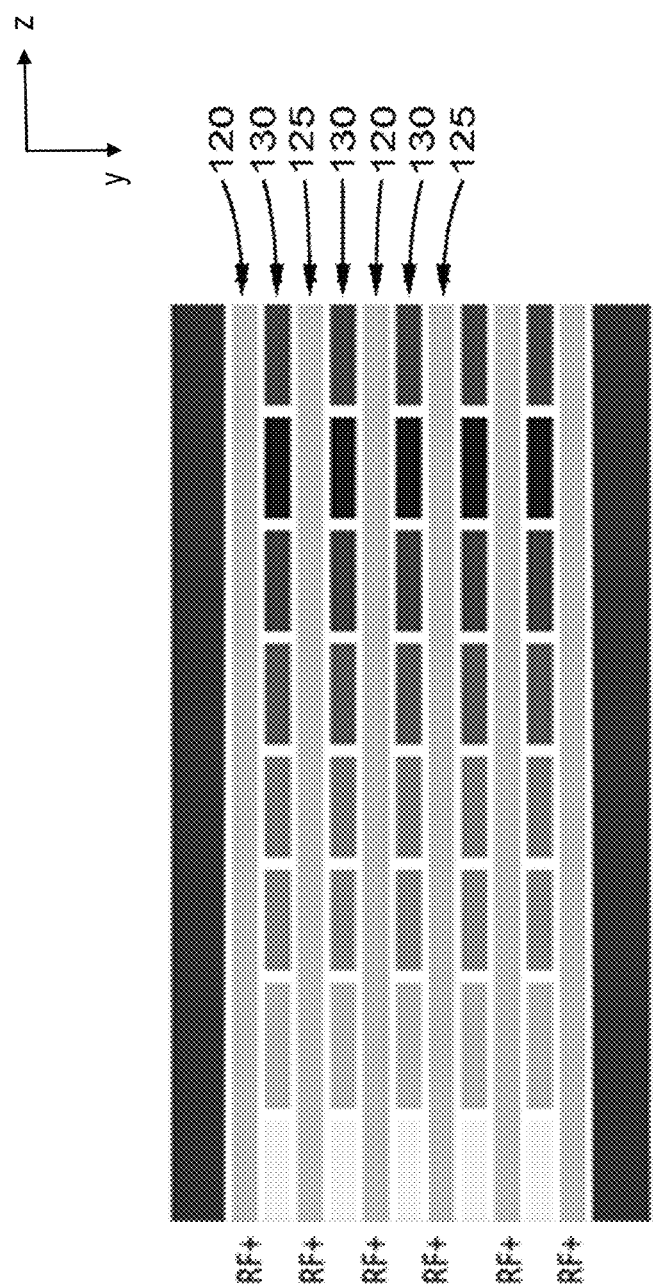
FIG. 4B illustrates a second exemplary operation of electrodes of a surface of a SLIM device.
Figure 4C:
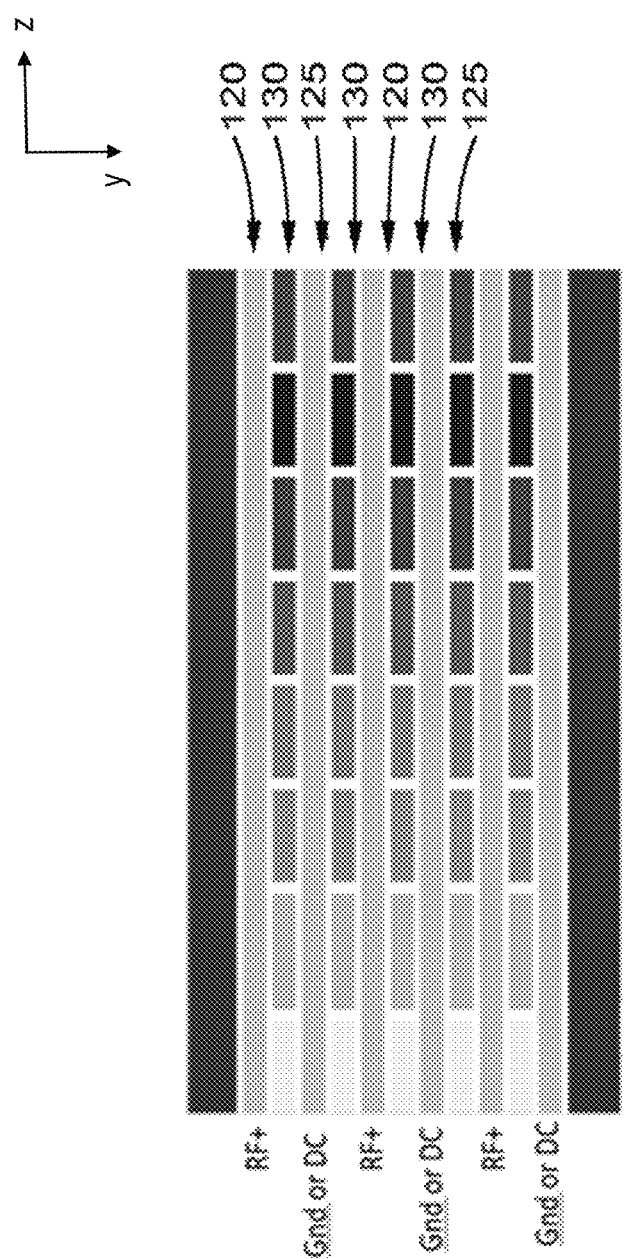
FIG. 4C illustrates a third exemplary operation of electrodes of a surface of a SLIM device.

In some implementations, adjacent electrodes 120 and 125 can receive RF voltage signals that have the same phase (e.g., zero phase shift). FIG. 4B illustrates an exemplary operation of a SLIM device where the adjacent electrodes of the first plurality of electrodes receive RF voltage signals having the same phase. For example, the electrodes 120 and 125 can be electrically coupled to the same RF control circuit. Alternately, the electrodes 120 and 125 can be electrically coupled to different RF control circuits that are configured to generate RF voltage signal synchronized in phase by the master control circuit. In some implementations, electrode 120 (or electrode 125) can receive an RF voltage signal and the adjacent electrode 125 (or electrode 120) can receive a DC potential (e.g., from DC control circuit) or a ground potential. FIG. 4C illustrates an exemplary operation of a SLIM device where the nearby electrodes (e.g., electrodes separated by a space where the second plurality of electrodes are present) of the first plurality of electrodes receive RF voltage signal and DC voltage signal (or ground potential).

The first plurality of electrodes can generate a pseudopotential that can prevent ions from approaching the first surface. Having a single RF control circuit (e.g., receiving power for a single power supply) to generate the pseudopotential can reduce the complexity and/or cost of SLIM technology. For example, RF control circuits/RF voltage sources can be expensive and it can be desirable to have fewer RF control circuits/RF voltage sources electrically coupled to a SLIM device. A SLIM device configured to couple to a single RF control circuit can have a simpler architecture compared to devices which require at least 2 phases of RF. In some implementations, this simplicity arises from a simpler RF control circuit that can utilize a single tap RF coil, a reduced number of readback components, electrical cables, and vacuum feedthrough connectors required to pass the signals into the vacuum chamber. These simplifications can reduce cost and/or make the SLIM device more robust (e.g., resulting from fewer potential failure points due to the reduction of system components).

Figure 5A:
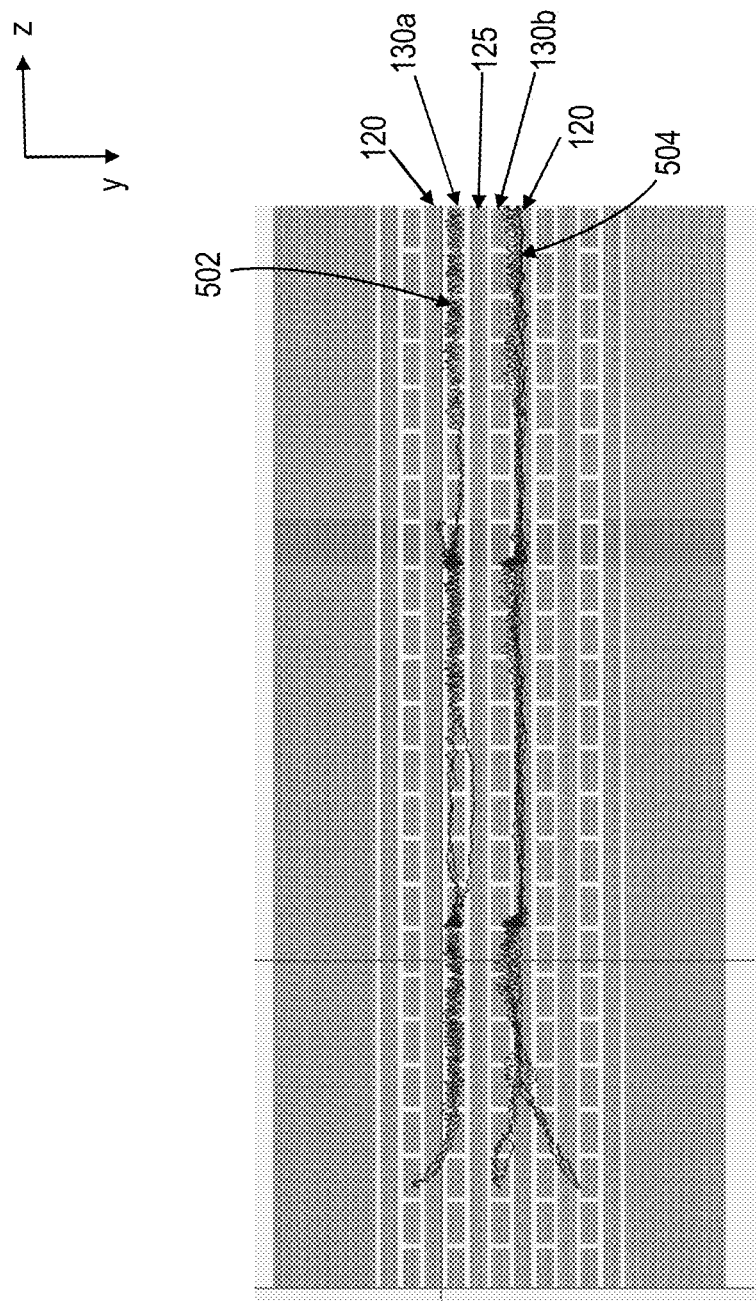
FIG. 5A illustrates an exemplary operation of a SLIM device with multiple ion channels.

In some implementations, applying a DC voltage signal of the same polarity as the ions being analyzed (relative to the RF reference potential) to alternate electrodes (e.g., to electrodes 125 or electrodes 120) of the first plurality of electrodes can generate multiple ion channels that are laterally separated (e.g., along the y axis). FIG. 5A illustrates an exemplary operation of a SLIM device with multiple ion channels. Electrodes 120 receive RF voltage signals (e.g., RF voltages having the same phase) and the electrode 125 located between the electrodes 120 receives a DC voltage signal and generates a repulsive potential that can generate separate ion channels 502 and 504 extending along the propagation axis. For example, ion channel 502 can be located between the adjacent electrodes 120 and 125, and the ion channel 504 can be located between the adjacent electrodes 125 and 120.

In some implementations, multiple ion channels can improve the throughput of SLIM devices. For example, ion channels 502 and 504 can perform (e.g., simultaneously) separate ion mobility separations. This can be done, for example, by providing a first ion packet to the ion channel 502 and a second ion packet to the ion channel 504 and applying traveling voltage signal to plurality of electrodes 130a and 130b. In some implementations, a given traveling signal can be applied to both the plurality of electrodes 130a and 130b. In some implementation, different traveling voltage signal can be applied to the plurality of electrodes 130a and 130b. This can result in different ion separation processes in the two channels (e.g., different ions can be selected in the two channels at the output). Such multi-channel SLIM arrangements can be used to extend the m/z (mass-to-charge ratio) or mobility range of analytes that can be passed through the device at the same time. For example, ions of high mobility can be transmitted within one channel using high traveling wave speed while ions of lower mobility can be transmitted in an adjacent channel using a lower traveling wave speed. In this way, multiple IMS separations can be achieved in parallel.

Figure 5B:
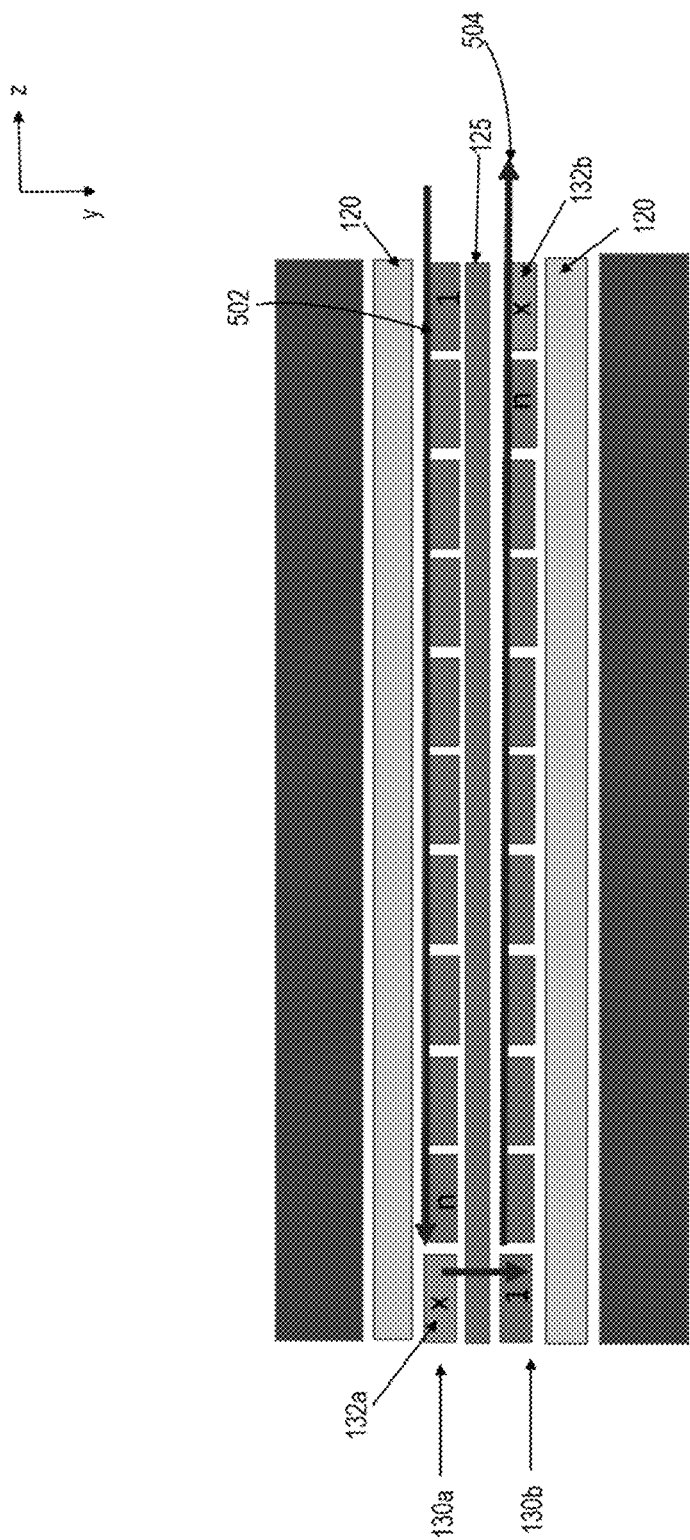
FIG. 5B illustrates exemplary coupling between ion channels of FIG. 5A.

FIG. 5B illustrates exemplary coupling of ion channels 502 and 504. The directionality of the traveling wave signal in each set of electrode groups is indicated by the 1-*n* arrow. The coupling of ion channels 502 and 504 can be achieved by including a switch electrode 132a in the plurality of electrodes 130a. The switch electrode 132a can lie in the path of the ions traveling along the ion channel 502 and can generate a gate potential that can direct ions in the ion channel 502 to the ion channel 504 when switched on. When switched off, ions in the ion channel 502 can continue to travel along the propagation axis (+z or −z axis). The switch electrode 132a can be electrically coupled to a switch control circuit (e.g., DC control circuit, AC control circuit, etc.). The switch control circuit can apply a DC voltage signal to the switch electrode 132a (e.g., at a regular interval). The master control circuit can control the operation of the switch control circuit. For example, the master control circuit can determine the time instants ("switch time") during which the switch electrode 132a will be switched (e.g., on to off, or off to on). The switch time can be based on the time at which ion packets are introduced to the SLIM device, the velocity of ion packets in the SLIM device, etc. In some implementations, a second switch electrode 132b can be included in the plurality of electrodes 130b that can direct ions in the ion channel 504 to the ion channel 502 when switched on. When switched off, ions in the ion channel 502 can continue to travel along the propagation axis (+z or −z axis). In some implementations, switch electrodes can be placed periodically in the plurality of electrodes 130a (and/or 130b). For example, every $(n+1)^{th}$ electrode can be a switch electrode.

Figure 6:
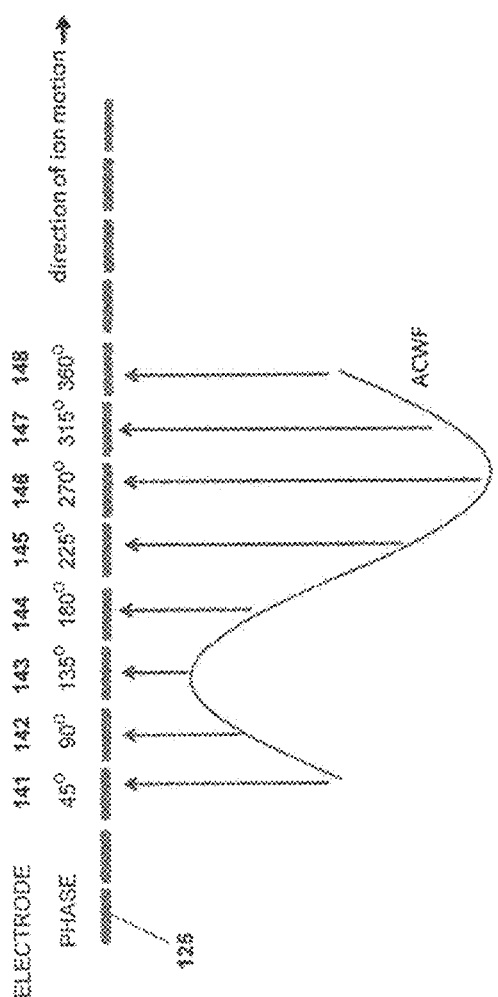
FIG. 6 illustrates an exemplary traveling voltage signal applied to electrodes of a SLIM device that can drive ions in the SLIM device.

FIG. 6 illustrates an exemplary traveling voltage signal that can be applied to the second plurality of electrodes 130 comprising electrodes 141-148 in repeating pattern (e.g., every eight electrodes receive similar traveling voltage signal). The exemplary voltage waveform in FIG. 6 is a sinusoidal waveform (e.g., AC voltage waveform). In FIG. 6, the electrodes 141-148 can receive voltage signals whose amplitude can be determined based on the voltage waveform (e.g., sinusoidal waveform, rectangular waveform, sawtooth waveform, biased sinusoidal waveform, etc.). For example, if a single wavelength of the AC waveform/sinusoidal voltage waveform is distributed over 8 electrodes (141-148), the voltage amplitudes applied to the 8 electrodes can be determined by selecting values from the AC waveform/sinusoidal voltage waveform for phase shifts corresponding to the total number of electrodes associated with the single wavelength. For example, the phase shift between adjacent electrodes of the electrodes 141-148 is 45 degrees (360 degrees [corresponding to a single wavelength] divided by 8). This can be achieved by electrically coupling electrodes 141-148 to different traveling wave control circuit (e.g., AC control circuits, pulsed current control circuits, etc.) that generate voltage signals that are phase shifted with respect to each other. In some implementations, the voltage/current waveform can take various pulse shapes (e.g., square, triangular, rectangular, sawtooth, etc.), can be periodic, can be aperiodic, etc. For example, the traveling wave control circuit can include one or more DC control circuits that generate DC voltage signals and AC control circuits that generate sinusoidal signals. In some implementations, the traveling wave control circuit can include one or more pulsed current control circuits that can generate pulsed voltage waveform and/or pulsed current waveforms (e.g., square, triangular, rectangular, sawtooth, etc.). The pulsed current control circuits can include multiple outputs that are electrically connected to multiple electrodes (e.g., electrodes 141-148). In some implementations, a pulsed current control circuit can apply multiple voltage signals (e.g., that constitute the pulsed waveform) to the multiple electrodes simultaneously. The various pulse shapes of the voltage/current waveform can be generated by a superposition of DC voltage signals and sinusoidal signals. The master control circuit can determine the phase shift between be AC signal generated by the various traveling wave control circuits. The shape/periodicity of the traveling voltage signal can be based on the phase shift between the AC signal applied to adjacent electrodes. The master control signal can determine the amplitudes of the DC voltage signals generated by DC control circuits. The master control circuit can determine the amplitude and/or frequency of the AC signal generated by the traveling wave control circuits.

In some implementations, the frequency of the AC signals can determine the speed of the traveling voltage/current waveform. An alternate approach to generating phase shifted AC signals for the traveling voltage/current waveform is the use of multiphase transformers. This approach can provide control of the phase relationships between multiple voltage outputs based upon the connection scheme of the multiple secondary windings of the transformer. In this way, one or more input drive voltage(s) signal can be used to generate multiple phase dependent outputs with only analog circuitry. A key differentiation between this approach and the digital generation methods described above is the fact that the phase dependence is entirely dictated by the physical wiring of the transformer and cannot be changed without making a physical change to the wiring. The phase relationships between digitally generated waveforms can be dynamically varied without a change in hardware.

As time progresses, the current/voltage waveform (e.g., AC waveform, sinusoidal voltage waveform, pulsed current/voltage waveform) can travel (e.g., along the direction of propagation). This can result in a change in the amplitude of the voltage applied to the electrodes 141-148. For example, the voltage applied to a first electrode (e.g., electrode 141) during a first time step is applied to the adjacent electrode (e.g., electrode 142) during the next time step. The controller 108 can include one or more traveling wave control circuits that can generate the pulsed voltage/current waveform, AC waveform, etc. In some implementations, the controller can include one or more RF control circuits that can generate an RF voltage waveform. The controller 108 can control the travel speed of the AC/RF/pulsed voltage/current waveform. As the AC/pulsed current waveform/pulsed voltage waveform travels, ions can be pushed along the direction of propagation and separated based on their mobilities.

Figure 7:
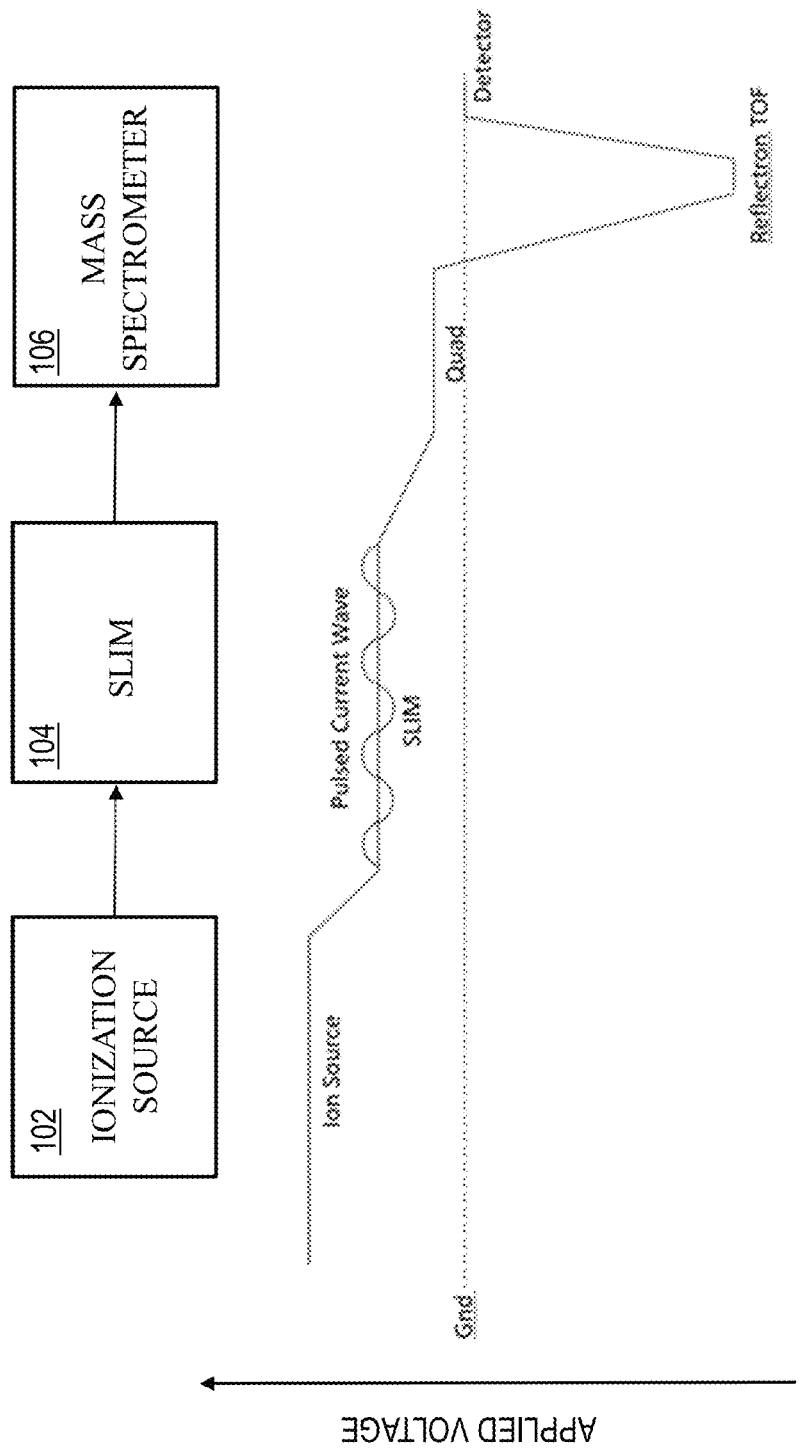
FIG. 7 illustrated an exemplary plot of bias voltages applied to the various components of the IMS system in FIG. 1.

In some implementations, the traveling voltage signal can be a pulsed current waveform or periodic waveform with no sign reversal which does not reverse the direction of current flow but still exhibits a time-varying applied potential. For example, the traveling voltage signal can be a biased sinusoidal waveform (e.g., a superposition of an AC voltage/current waveform and a DC current/voltage). In some implementations, it can be desirable to bias the SLIM device 104 in order to generate a potential gradient that can allow ions to flow from the ion source 102 to the SLIM device 104 and/or from SLIM device 104 to the mass spectrometer 106 (or ion detector) via the SLIM device 104. FIG. 7 illustrated an exemplary plot of the voltages (e.g., applied bias voltages) associated with the various components of the IMS system 100. The ion source 102 can have a voltage that is higher relative to the mass spectrometer 106 (which can include a quadrupole, a time of flight [TOF] reflectron and a detector). The first and/or the second surfaces of the SLIM device 104 can be biased (e.g., first plurality of electrodes 120 and 125, second plurality of electrodes 130, guard electrodes 110, and the like) at a bias voltage. The value of the SLIM device bias voltage can be in a range between the voltages of the ion source 102 and the mass spectrometer 106. Those skilled in the art will appreciate that the value of the SLIM device bias voltage can outside the range established by the ion source and mass spectrometer if gas flows are used to carry the ions up a DC bias hill, for example. As a result, the traveling voltage waveform in the SLIM device 104 can be a superposition of a sinusoidal AC voltage waveform and a DC voltage corresponding to the bias voltage of the SLIM device 104. The controller 108 can include a bias voltage source (e.g., DC voltage source) that can apply the bias voltage signal to the SLIM device 104. In some implementations, the control circuitry in the controller 108 can determine the absolute voltage or magnitude of the bias voltage (e.g., based on a user input, based on detection of voltages associated with the ion source 102 and mass spectrometer 106, etc.).

Figure 8:
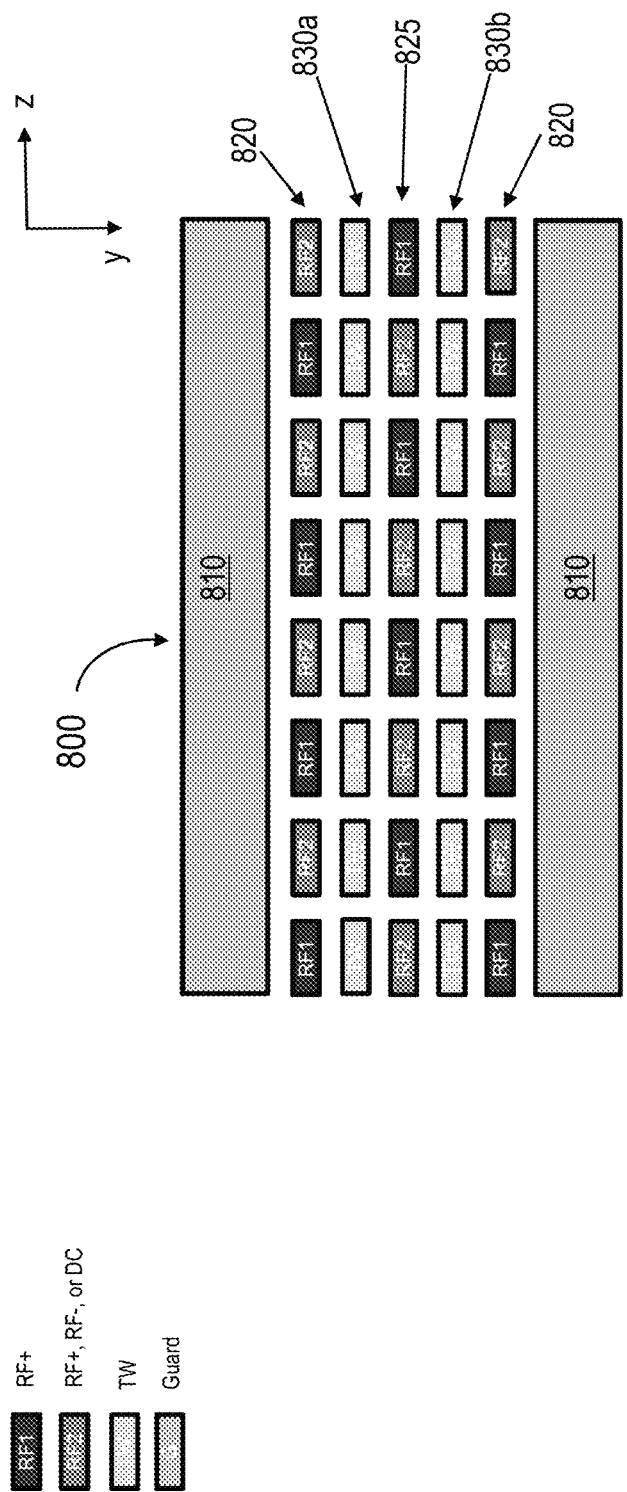
FIG. 8 illustrates an exemplary SLIM device with segmented electrodes for generating the pseudopotential.

FIG. 8 illustrates a surface 800 of a SLIM device with an further exemplary arrangement of electrodes. The surface 800 can be included in the SLIM device 104 (e.g., in place of first surface 103, second surface 105 or both). The surface 800 includes a first plurality of electrodes 820 and 825 segmented along the propagation axis (e.g., along z-axis). The first plurality of electrodes 820 can be separated from the first plurality of electrodes 825 along a lateral direction (e.g., along y-axis). For example, the lateral direction can be perpendicular to the propagation axis (e.g. z axis). The first plurality of electrodes 820 and 825 can receive RF voltage signals and/or DC voltage signals (or are connected to ground potential) and can generate a pseudopotential that can prevent/inhibit ions from approaching the surface 800. In some implementations, a first electrode in the first plurality of electrodes 820 can receive a first RF voltage signal, and a second electrode adjacent to the first electrode (along the propagation direction) can receive a second RF voltage signal (or a DC voltage signal/ground potential). This arrangement of can be repeated along the propagation direction.

In some implementations, every second electrode in the first plurality of electrodes 820 (or electrodes 825) can be connected to a first set of RF control circuits configured to generate a first RF voltage signal of a given phase. For example, every second electrode in the plurality of electrodes 820 (or s electrodes 825) can be electrically connected to the same RF control circuit. The remaining electrodes in the first plurality of electrodes 820 can receive a second RF voltage signal (phase shifted from the first RF voltage signal), a DC voltage signal or a ground potential. For example, the remaining electrodes in the plurality of electrodes 820 can be connected to a second set of RF control circuits configured to generate the second RF voltage signal (or DC control circuit configured to generate a DC voltage). In some implementations, the remaining electrodes in the plurality of electrodes 820 can be electrically connected to a given RF control circuit and/or DC control circuit. In some implementations, the electrodes in the first plurality of electrodes 820 receiving the first RF voltage signal, can be spatially shifted (e.g., along the propagation axis) from the electrodes in the first plurality of electrodes 825 receiving the first RF voltage signal. This can result in a checkered pattern of electrodes receiving a first RF voltage signal (labeled RF1 in FIG. 8) and a second voltage signal (labeled RF2 in FIG. 8). The second voltage signal can be a second RF voltage signal having a different phase than the first RF voltage signal, a DC voltage signal or a ground potential. A master control circuit can control the operation of the first set of RF control circuits and the second set of RF control circuits (or DC control circuits). For example, the master control circuit can control the amplitude/frequency/phase of RF voltage signal generated by the first and second set of control circuits. For example, a phase difference between the first and second RF voltage signal can be set to a predetermined value (e.g., based on a user input to the computing device 160)

A second plurality of electrodes 830a (or 830b) segmented along the propagation axis can be located in the space between the first plurality of electrodes 820 and 825. The second plurality of electrodes can receive a traveling voltage waveform and generate a drive potential that can drive ions along the propagation axis. For example, the second plurality of electrodes can be electrically coupled to a plurality of traveling wave control circuits (e.g., as described in FIG. 6) and can generate a traveling voltage waveform that can cause mobility based separation.

The surface 800 can include guard electrodes 810 that are positioned adjacent to the outer most of the first and second plurality of electrodes. For example, the guard electrodes 810 can be located at the edges of the surface 800 along the lateral direction. The guard electrodes 810 can receive a voltage signal (e.g., DC voltage signal from a DC control circuit) and generate a guard potential that can confine ions in the ion channels between the guard electrodes along the lateral direction.

Figure 9:
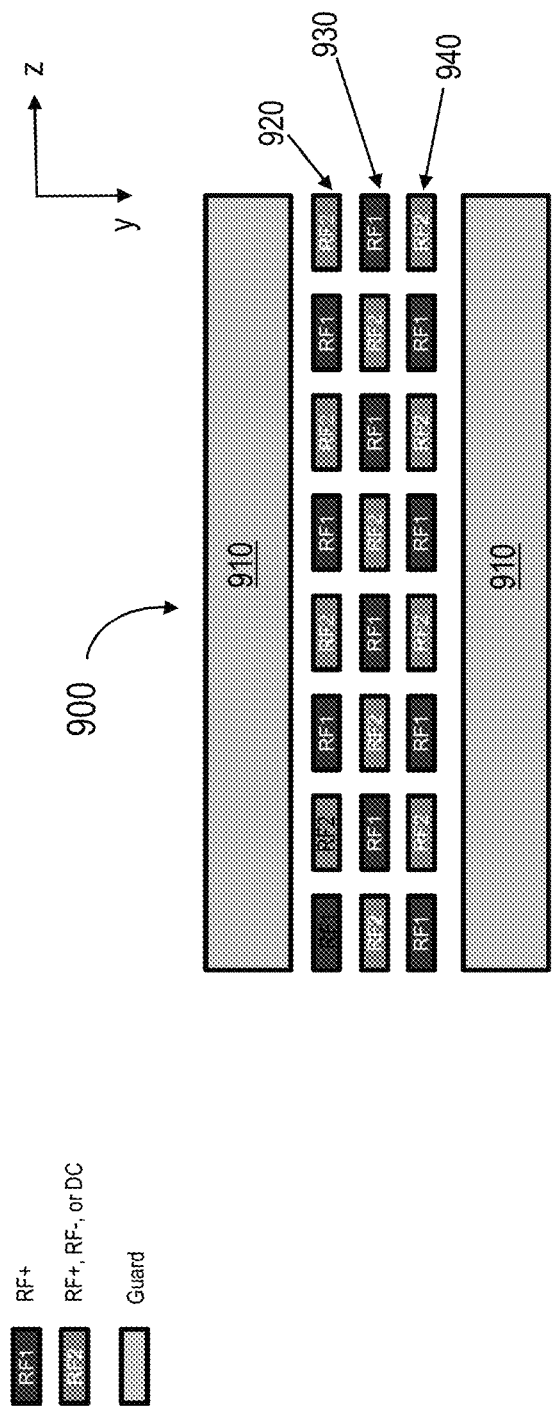
FIG. 9 illustrates an exemplary SLIM device with segmented electrodes for generating both the pseudopotential and the drive voltage.

FIG. 9 illustrates a surface 900 of a SLIM device with an exemplary arrangement of electrodes. The surface 900 can be included in the SLIM device 104 (e.g., in place of first surface 103, second surface 105 or both). This embodiment of the surface of the SLIM can generate an RF potential to both prevent/inhibit ions from approaching the surface and drive the ions along the propagation axis (e.g., to cause mobility based separation). The surface 900 includes a first plurality of electrodes 920, a second plurality of electrodes 930 and a third plurality of electrodes 940 segmented along the propagation axis (e.g., along z-axis). The first, second and third plurality of electrodes 920/930/940 can be separated from each other along a lateral direction (e.g., along y-axis). For example, the lateral direction can be perpendicular to the propagation axis (e.g. z axis).

One or more of the first, second and third plurality of electrodes 920-940 can receive RF voltage signals and/or DC voltage signals (or are connected to ground potential) and can generate a pseudopotential that can prevent/inhibit ions from approaching the surface 900. In some implementations, a first electrode in the first plurality of electrodes 920 can receive a first RF voltage signal, and a second electrode adjacent to the first electrode (along the propagation direction) can receive a second RF voltage signal (or a DC voltage signal/ground potential). This arrangement of first and second electrode can be repeated along the propagation direction (e.g., as described in FIG. 8). For example, every second electrode can be connected to a first set of RF control circuits configured to generate a first RF voltage signal of a given phase, and the remaining electrodes of the first plurality of electrodes 920 can be connected to a second set of RF control circuits configured to generate the second RF voltage signal (or DC control circuit configured to generate a DC voltage).

In some implementations, the electrodes in the first plurality of electrodes 920 receiving the first RF voltage signal, can be spatially shifted (e.g., along the propagation axis) from the electrodes in the second plurality of electrodes 930 receiving the first RF voltage signal. Similarly, electrodes in the second plurality of electrodes 930 receiving the first RF voltage signal, can be spatially shifted (e.g., along the propagation axis) from the electrodes in the third plurality of electrodes 940 receiving the first RF voltage signal. This can result in a checkered pattern of electrodes receiving a first RF voltage signal (labeled "RF1" in FIG. 9) and a second voltage signal (labeled RF2 in FIG. 9). The second voltage signal can be a second RF voltage signal having a different phase than the first RF voltage signal, a DC voltage signal or a ground potential. A master control circuit can control the operation of the first set of RF control circuits and the second set of RF control circuits (or DC control circuits).

In some implementations, the master control circuit can control the amplitude/frequency/phase of RF voltage signal generated by the first and second set of control circuits. For example, based on the phase difference between adjacent electrodes of the plurality of electrodes 920/930/940, a traveling RF wave can be created that can drive ions along the propagation axis and cause mobility based separation.

The alternating pattern applying RF voltages to adjacent electrodes described above is exemplary. In other implementations, traveling RF voltage signal can be repeated over multiple electrodes of the first/second/third plurality of electrodes along the direction of propagation. For example, every nth electrode (where n=2, 3, 4, 5, 6, 7, 8, etc.) can receive the same RF voltage signal. This can result in a sinusoidal waveform comprising RF voltage signals applied to multiple (e.g., periodic) electrodes of the first, second and third plurality of electrodes. For example, the sinusoidal waveform that repeats every third electrode can be generated by having a third set of RF control circuits that applies a third RF voltage signal to every third electrode in the plurality of electrodes 920/930/940.

In some implementations, the electrodes in the first plurality of electrodes 920 receiving a given RF voltage signal, can be spatially shifted (e.g., along the propagation axis) from the electrodes in the second plurality of electrodes 930 receiving the given RF voltage signal. Additionally or alternately, the electrodes in the second plurality of electrodes 930 receiving the given RF voltage signal, can be spatially shifted (e.g., along the propagation axis) from the electrodes in the third plurality of electrodes 940 receiving the given RF voltage signal. A master control circuit can control the operation of the various RF control circuits providing RF voltage signal to the various electrodes. For example, the master control circuit can control the amplitude/frequency/phase of RF voltage signal generated by the various control circuits.

Similar to the biased sinusoidal waveform, other time varying signals such as biased square waveforms, biased sawtooth waveforms, and biased triangular waveforms are all suitable for propelling ions through the device at an elevated potential energy due to the bias.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A device comprising:
   a first surface;
   a second surface adjacent to the first surface, the first and the second surfaces defining at least one ion channel, the at least one ion channel extending along a first direction, the second surface including:
     a first plurality of electrodes that includes a first electrode, a second electrode spaced apart from the first electrode along a second direction lateral to the first direction, and a third electrode spaced apart from the second electrode along the second direction wherein the first and third electrodes are configured to receive a first voltage signal and generate at least a portion of a pseudopotential that inhibits ions in the at least one ion channel from approaching the second surface and wherein the second electrode is positioned between the first and third electrodes and is configured to receive a second DC voltage signal or is connected to a ground reference voltage and the second electrode generates at least an additional portion of a pseudopotential that inhibits the ions in the at least one ion channel from approaching the second surface;
     a second plurality of electrodes that includes a first segmented electrode located between the first electrode and the second electrode and second segmented electrode located between the second and third electrodes; the first and second segmented electrodes being arranged and segmented along the first direction, wherein the second plurality of electrodes are configured to receive a third voltage signal to generate a first traveling drive potential that travels along the first direction, the first traveling drive potential configured to guide ions along the at least one ion channel; and
   a controller electrically coupled to the first and the second surface, the controller configured to generate the first, second and third voltage signals.

2. The device as recited in claim 1, wherein the first plurality of electrodes are continuous and extend along the second surface in the first direction.

3. The device as recited in claim 1, wherein the first plurality of electrodes are segmented and extend along the second surface in the first direction.

4. The device as recited in claim 1, wherein the first voltage signal is an first RF voltage signal.

5. The device as recited in claim 1, wherein the third voltage signal is a current waveform and the controller includes a plurality of traveling wave control circuits configured to generate a plurality of traveling wave voltage signals, wherein amplitudes and phases of the plurality of traveling wave voltage signals are predetermined, and wherein the current waveform includes the plurality of traveling wave voltage signals.

6. The device as recited in claim 5, wherein the waveform is a pulsed current waveform comprising one or more of a sawtooth current waveform, a rectangular current waveform and a sinusoidal current waveform, and wherein one or more of the sawtooth current waveform, the rectangular current waveform and the sinusoidal current waveform are biased by a static bias DC voltage component.

7. The device as recited in claim 1, wherein the second electrode is connected to a ground reference voltage.

8. The device as recited in claim 1, wherein the third voltage signal includes a traveling drive potential component and a static bias DC voltage component, and wherein the second plurality of electrodes are configured to generate a biased first traveling drive potential that travels along the first direction.

9. The device as recited in claim 8, wherein the second surface is coupled to first and second ion manipulation devices, the first ion manipulation device characterized by a first ion manipulation device potential, the first ion channel configured to receive ions from the first ion manipulation device; and the second ion manipulation device characterized by a second ion manipulation device potential, the at least one ion channel configured to transfer ions to the second ion manipulation device; and
   wherein the static DC bias voltage component has a magnitude which prevents the first traveling drive potential from exhibiting a sign reversal and creates a potential gradient from the first ion manipulation device to the first ion channel and from the first ion channel to the second ion manipulation device.

10. The device as recited in claim 9, wherein the static DC bias voltage component has a magnitude which prevents the first traveling drive potential from exhibiting a sign reversal and creates a potential gradient from the first ion manipulation device to the first ion channel and from the first ion channel to the second ion manipulation device.

11. A method comprising:
    providing a first surface and a second surface adjacent to the first surface, the first and the second surfaces defining an ion channel extending along a first direction, the second surface comprising:
      a first plurality of electrodes comprising a first electrode, a second electrode spaced apart from the first electrode along a second direction lateral to the first direction, and a third electrode spaced apart from the second electrode along the second direction, wherein the second electrode is positioned between the first and third electrodes and the first plurality of electrodes extending along the first direction, and a second plurality of electrodes including a first segmented electrode located between the first electrode and the second electrode and second segmented electrode located between the second and third electrodes; the first and second segmented electrodes being arranged along the first direction;

providing ions along the ion channel;

applying, by a controller, a first voltage signal to the first and third electrodes, wherein the first and third electrodes are each configured to generate at least a portion of a pseudopotential that inhibits ions in the first ion channel from approaching the second surface;

applying, by a controller, a second DC voltage signal to the second electrode or connecting the second electrode to a ground reference voltage and the second electrode is configured generate at least an additional portion of a pseudopotential that inhibits the ions in the first ion channel from approaching the second surface; and applying, by the controller, a third voltage signal to the second plurality of electrodes, the third voltage signal including a traveling drive potential.

12. The method as recited in claim 11, wherein the first plurality of electrodes are continuous and extend along the second surface in the first direction.

13. The method as recited in claim 11, wherein the first plurality of electrodes are segmented and extend along the second surface in the first direction.

14. The method as recited in claim 11, wherein the first voltage signal is a first radio frequency (RF) voltage signal.

15. The method as recited in claim 12, wherein the traveling drive potential includes a traveling wave component and a static bias DC voltage component.

16. The method as recited in claim 15, further comprising coupling the second surface to first and second ion manipulation devices, the first ion manipulation device characterized by a first ion manipulation device potential, the first ion channel configured to receive ions from the first ion manipulation device; and the second ion manipulation device characterized by a second ion manipulation device potential, the ion channel configured to transfer ions to the second ion manipulation device; and wherein the static DC bias voltage component has a magnitude which prevents the first traveling drive potential from exhibiting a sign reversal and creates a potential gradient from the first ion manipulation device to the first ion channel and from the first ion channel to the second ion manipulation device.

17. A device comprising:

a first surface;

a second surface adjacent to the first surface, the first and the second surface defining a first ion channel therebetween, the first ion channel extending along a first direction, the second surface comprising:

a first plurality of electrodes comprising a first electrode, a second electrode spaced apart from the first electrode along the first direction and a third electrode spaced apart from the second electrode along the first direction, the first plurality of electrodes arranged along the first direction, wherein the first and third electrodes are configured to receive a first RF voltage signal and the second electrode is positioned between the first and third electrodes and is configured to receive a second RF voltage signal, a DC voltage signal or is connected to a ground reference voltage;

a second plurality of electrodes spaced apart from the first plurality of electrodes along a second direction lateral to the first direction, the second plurality of electrodes comprising a fourth electrode and a fifth electrode adjacent to the fourth electrode and arranged along the first direction, wherein the fourth electrode is configured to receive a traveling wave voltage signal; and a controller electrically coupled to the first and the second surfaces.

18. The device as recited in claim 17, wherein the controller is configured to generate the first RF voltage signal having a first phase, and generate the second RF voltage signal having a second phase, wherein a first phase difference between the first phase and the second phase is set to a first predetermined value.

19. The device as recited in claim 17, wherein the first plurality of electrodes and the second plurality of electrodes are configured to generate a traveling drive potential that travels along the first direction, the first traveling drive potential configured to guide ions along the first ion channel.

* * * * *